2 Sheets--Sheet 1.
G. A. SWARTZ.
Corn-Harvester.
No. 164,111.
Patented June 8, 1875.
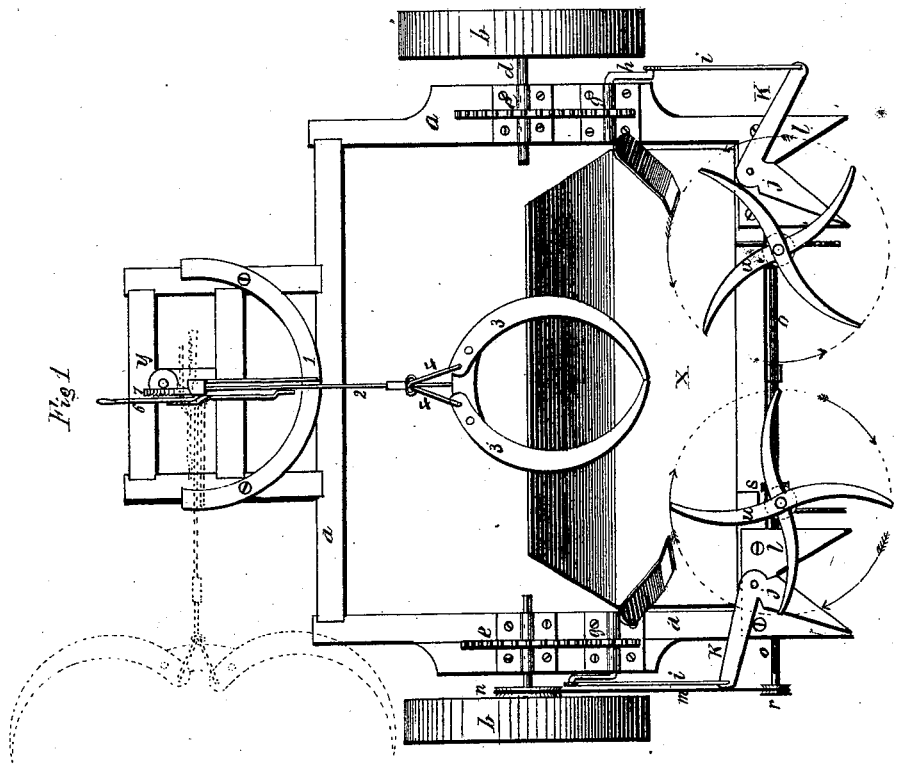
WITNESSES.
J. Wm Garner,
Wm B. Upperman.
INVENTOR
Geo. A. Swartz
by F. A. Lehmann
Atty.
THE GRAPHIC CO.PHOTO-LITH.39 & 41 PARK PLACE,N.Y.

2 Sheets--Sheet 2.
G. A. SWARTZ.
Corn-Harvester.
No. 164,111. Patented June 8, 1875.
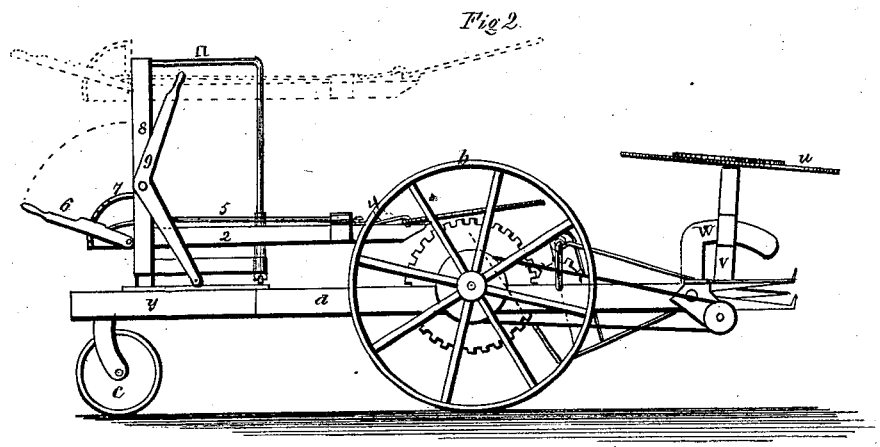
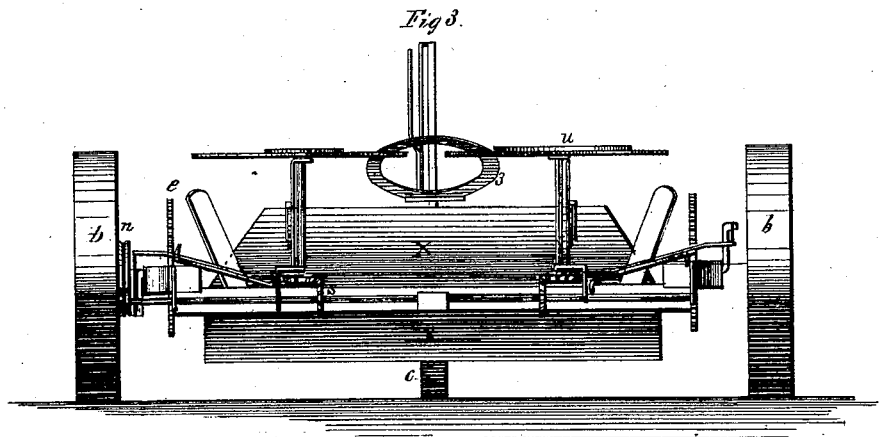
WITNESSES.
INVENTOR.
Geo. A. Swartz
by F. A. Lehmann
att'y

UNITED STATES PATENT OFFICE.

GEORGE A. SWARTZ, OF ORANGEVILLE, ILLINOIS.

IMPROVEMENT IN CORN-HARVESTERS.

Specification forming part of Letters Patent No. 164,111, dated June 8, 1875; application filed December 9, 1874.

*To all whom it may concern:*

Be it known that I, GEO. A. SWARTZ, of Orangeville, in the county of Stephenson and State of Illinois, have invented certain new and useful Improvements in Corn-Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-harvesters; and it consists in, first, the combination of a swinging frame, provided with a roller and way upon which to travel, and vertically-adjustable clasps, whereby the stalks are lifted from the platform and carried to the side of the frame to be dropped on the ground; second, the combination of devices whereby the reels are made adjustable, so that they will catch the stalks when they are standing in an inclined position; third, the combination of devices whereby the clasps are operated; fourth, the combination of the swinging frame, clasps, and a lever by which the clasps are raised upward, all of which will be more fully described hereafter.

Figure 1 is a plan view of my invention. Fig. 2 is a side elevation of the same, and Fig. 3 detail view of the same.

$a$ represents an ordinary rectangular frame of any desired construction, which is supported upon the two driving-wheels $b$ upon the sides, and the caster-wheel $c$ under the rear end. Secured to each of the short axles $d$ is a gear-wheel, $e$, which operates the pinions $g$, having the cranks $h$ secured to them. All four of these wheels may be placed so as to revolve in the slots in the frame, as shown, or in any other position preferred. Attached to each of the cranks $h$ is a connecting-rod, $i$, which operates the knives $j$ through the arms $k$. These knives vibrate back and forth over the V-shaped plates $l$, which plates and knives are secured to the front corners of the frame, so that the knives will cut the stalks in a slanting direction. By causing them to cut in a slanting direction the stalks are more easily cut, and are not so liable to clog the knives, thus making the draft easier on the team. On one or both of the axles $d$ is secured a pulley, $n$, over which passes a band, chain, or cord, $m$, which communicates motion to the shaft $o$ journaled on the front end of the frame, through the pulley $r$. Secured to the shaft are two driving-wheels, $s$, which communicate motion, through similar wheels $t$, to the reels $u$. The supports $v$, to which the reels are attached, and which hold the reels in position, are pivoted at their lower ends upon the driving-shaft $o$, so that the reels can be inclined forward to any desired degree, and thus catch those stalks that are leaning downward. Where the reels are held in one position and revolve horizontally around, they pass over the tops of all those stalks that are not standing straight up, and thus the machine would do its work very imperfectly. Secured to the front of the frame, and just in the rear of each reel, is a curved guide, $w$, for adjusting and holding the reels at any desired angle. Back of the knives and reels, and fastened to the frame, is the platform $x$, of any desired form or construction, upon which the stalks are deposited as fast as they are cut. To the rear end of the frame $a$ is attached a smaller frame, $y$, which is supported by the caster-wheel $c$. At or near the center of this frame is pivoted one end of the frame 1, which frame is composed of a rod bent into the shape of an inverted U, the free end of which is provided with a friction-roller to travel on the curved way 1 as the frame is swung around from side to side. Sliding vertically up and down upon this frame is the T-shaped bar 2, upon the forward end of which are pivoted the two curved arms 3, which form the clasp for lifting the stalks from the platform and depositing them upon the ground, at either side of the machine, in shocks. Attached to the rear end of these arms, back of their pivots, by the two short rods 4, is the operating-rod 5, which has its rear end secured to a hand-lever, 6, pivoted to the side of the bar 2, and which lever is provided with a ratchet, 7. The arms are clasped around the stalks, as they stand upon the platform, by drawing back upon the hand-lever 6, and then, by pressing the lever into the ratchet, the stalks will be securely held. Attached to one side of the pivoted arm of the frame 1 is a vertical bar, 8, to which is pivoted the bent lever 9, one end of which forms a hand-lever, while the other is provided with a friction-roller, which catches under the lower edge of the bar 2. By bearing down upon the handle the clasp is raised vertically upward to any desired height upon the frame, so that it can be dropped down over the top of the stalks, and then the stalks raised upward above the top of the wheels, the frame swung around to one side, and the stalks dropped upon the ground.

Having thus described my invention, I claim—

1. The vertically-adjustable clasp, in combination with a frame provided with a roller and way upon which to travel, whereby the stalks may be readily lifted over the side of the frame, substantially as specified.

2. The combination of the shaft $o$, wheels $s$ $t$, reels $u$, supports $v$ pivoted upon the shaft, and guides $w$, substantially as specified.

3. The combination of the bar 2, arms 3, rods 4, rod 5, lever 6, and ratchet, substantially as described.

4. The combination of the clasp, frame, and lever 9, substantially as set forth.

In testimony that I claim the foregoing I have hereunto set my hand.

GEORGE A. SWARTZ.

Witnesses:
H. W. BOLENDER,
A. FAHE.